United States Patent [19]
Seseke-Koyro et al.

[11] Patent Number: 5,362,469
[45] Date of Patent: Nov. 8, 1994

[54] PREPARATION OF ULTRAPURE HYDROGEN FLUORIDE

[75] Inventors: Ulrich Seseke-Koyro, Vellmar; Andreas Grossmann, Sehnde; Werner Rudolph, Hanover, all of Germany

[73] Assignee: Solvay Fluor und Derivate GmbH, Hanover, Germany

[21] Appl. No.: 969,712

[22] Filed: Oct. 28, 1992

[30] Foreign Application Priority Data

Oct. 31, 1991 [DE] Germany .............................. 4135918

[51] Int. Cl.$^5$ .................................................. C01B 7/19
[52] U.S. Cl. ..................................... 423/484; 423/488
[58] Field of Search .................... 423/240 R, 483, 484, 423/486, 488; 210/753; 203/29

[56] References Cited

U.S. PATENT DOCUMENTS

| | | | |
|---|---|---|---|
| 3,166,379 | 1/1965 | Bradely et al. | 423/484 |
| 4,491,570 | 1/1985 | Wheaton et al. | 423/483 |
| 4,668,497 | 5/1987 | Miki | 423/484 |

FOREIGN PATENT DOCUMENTS 1141260  1/1969  United Kingdom ................ 423/484

Primary Examiner—Benjamin R. Fuller
Assistant Examiner—Valerie Ann Lund
Attorney, Agent, or Firm—Evenson, McKeown, Edwards & Lenahan

[57] ABSTRACT

A process for preparing ultrapure hydrogen fluoride by contacting impure hydrogen fluoride with elemental fluorine in the presence of metal fluorides. The ultrapure hydrogen fluoride which can be obtained can be used in electronics or optics or for preparing fluorine-containing organic or inorganic compounds or ultrapure hydrofluoric acid.

6 Claims, No Drawings

PREPARATION OF ULTRAPURE HYDROGEN FLUORIDE

BACKGROUND OF THE INVENTION

This invention relates to a process for preparing ultrapure hydrogen fluoride.

Considerable quantities of hydrogen fluoride are required in industry. For example, hydrogen fluoride can be used as an etching agent per se or in the form of hydrofluoric acid. Hydrogen fluoride or hydrofluoric acid is furthermore used for preparing inorganic or organic compounds which contain fluorine.

Some fields of use, particularly electronics and optics, require purified hydrogen fluoride. This is because technical grade hydrogen fluoride usually contains small amounts of impurities such as water, arsenic, and, in some cases, additionally boron compounds, phosphorus compounds, sulfur compounds and carbon compounds. In critical fields of use, such impurities must be removed. Thus, there is a need for more useful processes for preparing ultrapure hydrogen fluoride.

SUMMARY OF THE INVENTION

It is the object of the present invention to provide an effective process for preparing ultrapure hydrogen fluoride.

Another object of the invention is to provide a process for preparing ultrapure hydrogen fluoride which is simple to carry out.

These and other objects are achieved in accordance with the present invention by providing a process for preparing ultrapure hydrogen fluoride from contaminated hydrogen fluoride comprising the step of contacting said contaminated hydrogen fluoride with a sufficient amount of elemental fluorine in the presence of metal fluoride.

DETAILED DESCRIPTION OF PREFERRED EMBODIMENTS

As used herein the term "ultrapure" hydrogen fluoride refers to hydrogen fluoride containing less than 1 ppm each of water, metals, boron compounds, phosphorous compounds, sulfur compounds, and carbon compounds. The term "contaminated" hydrogen fluoride refers to hydrogen fluoride containing more 1 ppm of any of the aforementioned contaminants.

In a preferred embodiment, the term "ultrapure" hydrogen fluoride refers to hydrogen fluoride containing less than 10 ppb, especially less than 5 ppb of metals.

The process according to the invention for the preparation of ultrapure hydrogen fluoride from hydrogen fluoride by bringing the hydrogen fluoride into contact with elemental fluorine is characterized in that the hydrogen fluoride is brought into contact with elemental fluorine in the presence of a metal fluoride. The purified hydrogen fluoride can then be obtained by distillation. More or less pure hydrogen fluoride can be used as starting material for the process according to the invention. It is advantageously used for preparing ultrapure hydrogen fluoride from hydrogen fluoride having a purity of not less than 95%.

In principle, any metal fluorides, for example fluorides from metals of groups 1, 2, 3 or 4 of the periodic table, or fluorides of metals of the subgroups of the periodic table, can be used, with the proviso that they must be able to form a reaction product with one of the impurities to be removed, which reaction product is slow to evaporate. However, fluorides of metals from the first or second group of the periodic table, in particular fluorides of alkali metals, for example lithium fluoride, sodium fluoride, potassium fluoride or their hydrogen fluoride adducts, for example $NaHF_2$ or $KHF_2$, are preferably used as the metal fluorides. In principle, starting materials which can also be used are metal salts which react with hydrogen fluoride in situ to yield metal fluorides with the formation of volatile reaction products or water. For example, metal hydroxides, metal oxides or metal carbonates can be employed. However, it is preferred to use fluorides directly as starting materials.

Water contained in the hydrogen fluoride to be purified reacts with fluorine to give hydrogen fluoride and oxygen.

Non-metals react to give non-metal fluorides. For example, arsenic compounds and phosphorus compounds react with fluorine essentially with the formation of arsenic pentafluoride or phosphorus pentafluoride. Carbon compounds which are hydrocarbons essentially react to form carbon tetrafluoride. Halogen-containing hydrocarbons react to give the corresponding halofluoromethanes. If hetero atoms are present, other compounds which are formed are the corresponding hetero atom fluorides.

It is advantageous to employ the fluorine in an amount not less than that required stoichiometrically for converting the impurities into removable substances. That is to say, the amount of fluorine employed should not be less than the amount required to stoichiometrically react with the impurities to be removed. In other words, the amount used be sufficient for converting the water present into hydrogen fluoride and oxygen, for converting arsenic compounds which are present into arsenic pentafluoride, for converting phosphorus compounds which are present into phosphorus pentafluoride and for converting any carbon compounds which may be present into fluoromethanes. The fluorine is preferably employed in excess. It is advantageous to employ 2 to 8 times the stoichiometrically required amount of fluorine, or more.

The arsenic pentafluoride, or phosphorus pentafluoride, formed in the purification process according to the invention, which in most cases constitutes the greatest proportion of the impurities, reacts further, for example, with the fluoride salt present in the reaction mixture to form a metal hexafluoroarsenate complex or a metal hexafluorophosphate complex. The metal fluoride is therefore advantageously employed in an amount not less than the amount stoichiometrically required for converting the arsenic fluoride and/or phosphorus pentafluoride which forms into metal fluoride complexes. It is advantageous to employ 1 to 20 times the amount of metal fluoride which is stoichiometrically required for converting the non-metal fluorides into non-metal fluoride complexes, or even more.

The hydrogen fluoride can be brought into contact with elemental fluorine under reduced pressure, under ambient pressure or under elevated pressure. The process can be carried out, for example, at pressures in the range from 0.5 bar to 10 bar or more. It is advantageous to carry out the process either under ambient pressure or under elevated pressure, for example between ambient pressure and 7 bar.

The hydrogen fluoride is advantageously brought into contact with elemental fluorine at a temperature in the range from −20° C. to 150° C. in the reaction mixture, preferably 20° C. to 100° C. The process is more effective if temperature is higher.

The elemental fluorine can be employed in pure form or in the form of a mixture with an inert gas. For example, mixtures of fluorine with noble gases or nitrogen can be used. Mixtures of fluorine with hydrogen fluoride can also be used.

Ultrapure hydrogen fluoride can then be obtained from the reaction mixture by distillation. The ultrapure hydrogen fluoride obtained can be used as such, for example as an etching agent in electronics and optics.

It is also possible to prepare an ultrapure hydrofluoric acid by mixing the ultrapure hydrogen fluoride which can be obtained by the process according to the invention with water. Depending on the amount of water used, it is, of course, possible to prepare hydrofluoric acids of any desired concentration.

It is furthermore possible to use the ultrapure hydrogen fluoride which can be obtained by the process according to the invention for preparing fluorine-containing compounds. For example, it is possible to prepare inorganic fluoride or organic fluorine-containing compounds by known methods by reacting ultrapure hydrogen fluoride obtained by the process of the invention with a suitable precursor for the compound to be prepared.

The process according to the invention has the advantage that its impurities form reaction products which have very low boiling points (e.g. oxygen, carbon tetrafluoride), metal fluoro complexes having a vapor pressures which are not detectable at the boiling point of hydrogen fluoride, as well as HF when the process is carried out. These reaction products can be removed in a simple manner by distillation.

The invention will be described in further detail by the following illustrative examples which are not intended to limit its scope.

EXAMPLE 1

Purification of Hydrogen Fluoride Under Ambient Pressure

The apparatus used was a unit comprising a reaction vessel provided with an attached reflux condenser and a distillation head. 1,000 g of technical grade hydrogen fluoride gas were condensed into the reaction vessel. The HF-purity of the hydrogen fluoride was 99.9% by weight. The hydrogen fluoride contained 88 ppm of water, 20 ppm of sulfur in sulfate form and approximately 500 ppm of arsenic as impurities. The total of the metal impurities was approximately 10 ppm. For test purposes, the hydrogen fluoride gas was doped with 10 ppm of n-pentane. 7,500 ppm of lithium fluoride were then introduced into the reaction vessel. A mixture of nitrogen and fluorine (volumetric ratio of nitrogen to fluorine approximately 9:1) was then passed into the reaction mixture. The total amount of fluorine introduced was approximately 0.16 mole. The stoichiometrically required amount would have been approximately 0.03 mole. When the introduction of fluorine was complete, the hydrogen fluoride was distilled and subsequently analyzed. The water content was determined by the Karl-Fischer method, and the remaining components by means of ICP (Inductive Coupled Plasma), GF-AAS (Graphite Furnace Atomic Absorption Spectroscopy) and by headspace gas chromatography, coupled with mass spectroscopy (GC-MS). The contents of water and the other impurities were in each case below the detection limit.

EXAMPLE 2

Purification of Hydrogen Fluoride Using Fluorine Under Pressure

The apparatus used this time was a pressurized cylinder with a volumetric content of 3.8 liters. This pressurized cylinder was sealable and connected to a distillation device via a conduit which could be closed off.

Two liters of technical grade hydrogen fluoride were introduced into the pressurized cylinder. This hydrogen fluoride had the same composition as the hydrogen fluoride used in Example 1. Lithium fluoride was then introduced into the pressurized cylinder until the lithium fluoride content was approximately 15,000 ppm. The cylinder was subsequently charged with elemental fluorine until the pressure in the cylinder was approximately 5.3 bar. At this point in time, approximately 0.43 mole of $F_2$ was present in the pressurized cylinder; the stoichiometrically required amount would have been 0.06 mole. The contents of the pressurized cylinder were then brought to approximately 100° C. and kept at this temperature for 12 hours. To improve mixing of the contents, the pressurized cylinder was moved to and fro mechanically. The pressurized cylinder was then cooled to room temperature, and readily volatile components were discharged. The content of the pressurized cylinder was subsequently distilled. Again, the distillate was analyzed. The contents of water and carbon compounds were less than 1 ppm. The concentrations of the remaining impurities were also only present as minute traces. For example, the concentration of sulfate was less than 0.1 ppm, the concentration of arsenic was less than 0.001 ppm, and the concentration of metal impurities was less than 0.005 ppm.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for preparing ultrapure hydrogen fluoride from hydrogen fluoride contaminated with at least one impurity selected from the group consisting of water, metals, arsenic, boron compounds, phosphorous compounds, sulfur compounds and carbon compounds, said process comprising the steps of contacting said contaminated hydrogen fluoride with elemental fluorine in the presence of metal fluoride to convert said at least one impurity to a product which is separable from hydrogen fluoride by distillation, and distilling ultra pure hydrogen fluoride from said product.

2. A process according to claim 1, wherein the metal fluoride used is one or more fluorides of metals from the first or second group of the periodic table.

3. A process according to claim 1, wherein the fluoride used is selected from the group consisting of lithium fluoride, sodium fluoride, potassium fluoride, and a hydrogen fluoride adduct of lithium, sodium or potassium fluoride.

4. A process according to claim 1, wherein the fluorine is employed in an amount from 2 to 8 times that required to stoichiometrically react with any non-metal impurities present in the contaminated hydrogen fluoride to form corresponding non-metal fluorides.

5. A process according to claim 1, wherein hydrogen fluoride and elemental fluorine are brought into contact with each other at a temperature of from −20° C. to 150° C.

6. A process according to claim 1, wherein water is added to the purified hydrogen fluoride to obtain hydrofluoric acid.

* * * * *